US009183068B1

(12) United States Patent
Shum et al.

(10) Patent No.: US 9,183,068 B1
(45) Date of Patent: Nov. 10, 2015

(54) VARIOUS METHODS AND APPARATUSES TO RESTART A SERVER

(75) Inventors: Han Shum, Los Gatos, CA (US); Chris Newman, Pasadena, CA (US)

(73) Assignee: Oracle America, Inc., Redwood City, CA (US)

( * ) Notice: Subject to any disclaimer, the term of this patent is extended or adjusted under 35 U.S.C. 154(b) by 915 days.

(21) Appl. No.: 11/282,256

(22) Filed: Nov. 18, 2005

(51) Int. Cl.
*G06F 15/173* (2006.01)
*G06F 11/07* (2006.01)

(52) U.S. Cl.
CPC ........ *G06F 11/0703* (2013.01); *G06F 11/0793* (2013.01)

(58) Field of Classification Search
CPC ................ G06F 11/07; G06F 11/0703; G06F 11/07051; G06F 11/0793
USPC .................................................. 709/223–224
See application file for complete search history.

(56) References Cited

U.S. PATENT DOCUMENTS

| | | | | |
|---|---|---|---|---|
| 5,544,320 | A * | 8/1996 | Konrad | 709/203 |
| 6,286,039 | B1 * | 9/2001 | Van Horne et al. | 709/219 |
| 6,289,380 | B1 * | 9/2001 | Battat et al. | 709/221 |
| 6,308,328 | B1 * | 10/2001 | Bowcutt et al. | 725/111 |
| 6,374,293 | B1 * | 4/2002 | Dev et al. | 709/220 |
| 6,510,466 | B1 * | 1/2003 | Cox et al. | 709/229 |
| 6,553,403 | B1 * | 4/2003 | Jarriel et al. | 709/202 |
| 7,191,228 | B1 * | 3/2007 | Antony et al. | 709/224 |
| 7,246,354 | B1 * | 7/2007 | Antony et al. | 718/101 |
| 7,293,084 | B1 * | 11/2007 | Kanmochi | 709/224 |
| 7,327,228 | B2 * | 2/2008 | Min et al. | 340/426.1 |
| 2003/0177224 | A1 * | 9/2003 | Nguyen | 714/13 |
| 2003/0217146 | A1 * | 11/2003 | Srivastava et al. | 709/224 |
| 2003/0221002 | A1 * | 11/2003 | Srivastava et al. | 709/224 |
| 2003/0225880 | A1 * | 12/2003 | Srivastava et al. | 709/224 |
| 2006/0041654 | A1 * | 2/2006 | Aki et al. | 709/223 |
| 2006/0067209 | A1 * | 3/2006 | Sheehan et al. | 370/216 |
| 2006/0129666 | A1 * | 6/2006 | Bohm et al. | 709/223 |
| 2006/0156298 | A1 * | 7/2006 | Min et al. | 717/168 |
| 2006/0180672 | A1 * | 8/2006 | Chu | 235/487 |
| 2007/0050484 | A1 * | 3/2007 | Oertig et al. | 709/220 |

* cited by examiner

*Primary Examiner* — Jonathan Bui
(74) *Attorney, Agent, or Firm* — Marsh Fischmann & Breyfogle LLP; Jonathon A. Szumny

(57) ABSTRACT

Various methods and apparatuses are described for a server that includes at least a server starter program, a monitor program, and a service program. The server starter program runs resident on a computer readable storage medium. The server starter program contains code scripted to start and stop server applications. The monitor program also runs resident on the computer readable storage medium. The monitor program contains code scripted to detect a failure associated with a first server application and to communicate to the server starter program to re-start one or more server applications based upon the detected failure associated with the first server application. The service program registers as an operating system service with the operating system. The service program controls requests and communicates to the operating system on behalf of the first server application in the server.

20 Claims, 3 Drawing Sheets

VARIOUS METHODS AND APPARATUSES TO RESTART A SERVER

NOTICE OF COPYRIGHT

A portion of the disclosure of this patent document contains material that is subject to copyright protection. The copyright owner has no objection to the facsimile reproduction by anyone of the server and its programs, as they appears in the Patent and Trademark Office Patent file or records, but otherwise reserves all copyright rights whatsoever.

FIELD OF THE INVENTION

Embodiments of the invention generally relate to servers. More particularly, an aspect of an embodiment of the invention relates to automatically restarting a server.

BACKGROUND OF THE INVENTION

Software bugs can cause server applications to crash, which makes these services unavailable. A solution to improve the availability of server service is to form a cluster of two or more servers to service multiple users in a high availability configuration (HA). The high availability solution, such as a Sun Cluster™ and a Veritas Cluster Server™, can provide for another server to provide similar functionality when server applications fail on a first server. Some HA frameworks are constructed for specific implementation for one customer who has multiple clients using the HA cluster of servers. For complex server software that involves multiple processes with dependencies, implementing an agent for every framework with all the complexity to detect failures and initiate restart may be impractical and prone to errors.

SUMMARY OF THE INVENTION

Various methods and apparatuses are described for a server that includes at least a server starter program, a monitor program, and a service program. The server starter program runs resident on a computer readable storage medium. The server starter program contains code scripted to start and stop server applications. The monitor program also runs resident on the computer readable storage medium. The monitor program contains code scripted to detect a failure associated with a first server application and to communicate to the server starter program to re-start one or more server applications based upon the detected failure associated with the first server application. The service program registers as an operating system service with the operating system. The service program controls requests and communicates to the operating system on behalf of the first server application in the server.

BRIEF DESCRIPTION OF THE DRAWINGS

The drawings refer to embodiments of the invention in which.

Figure 1:
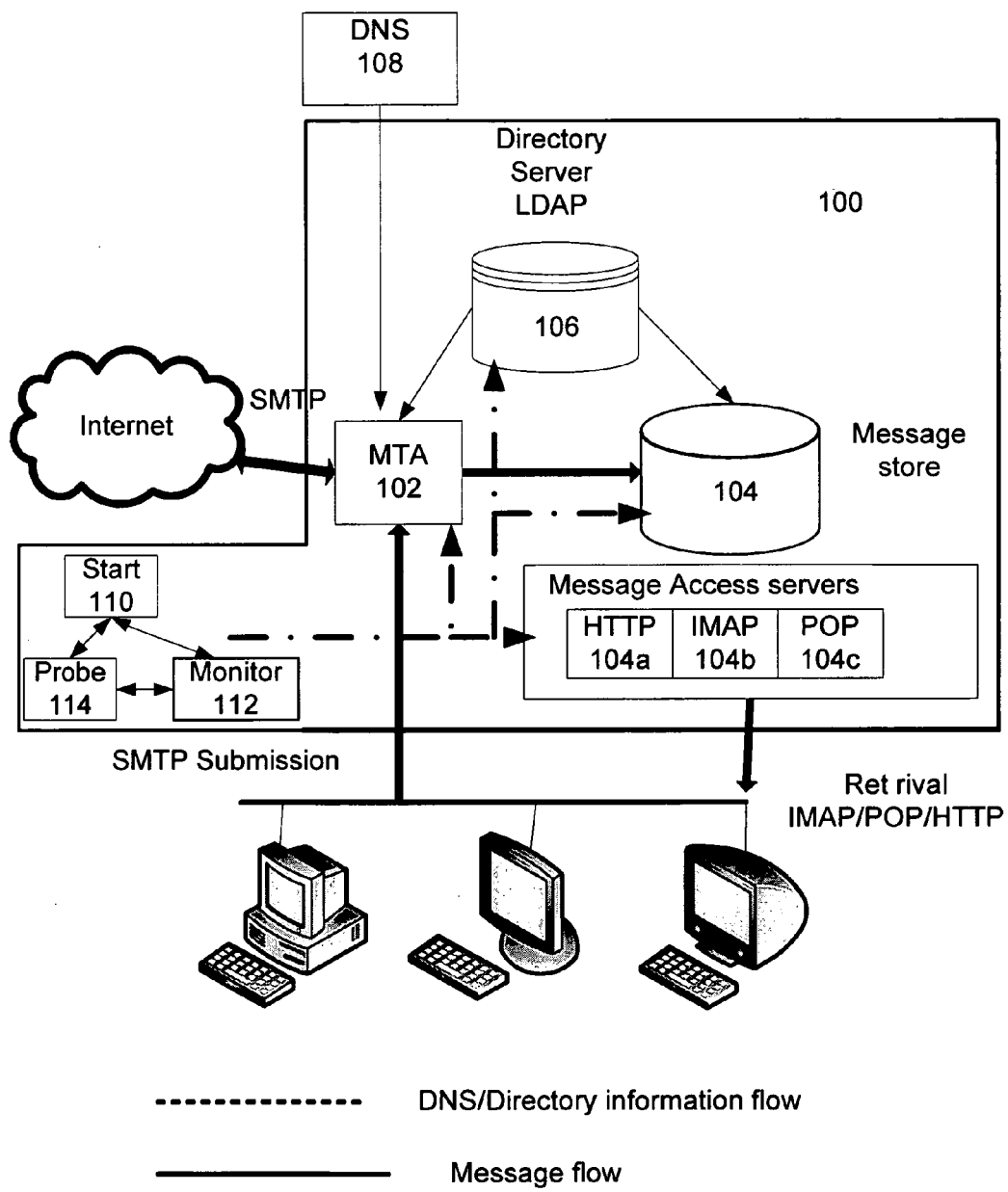
FIG. 1 illustrates an embodiment of messaging server that includes a server starter program and a monitor program.

While the invention is subject to various modifications and alternative forms, specific embodiments thereof have been shown by way of example in the drawings and will herein be described in detail. The embodiments of the invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific server applications, named components, connections, types of servers, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as a first server application, may be made. However, the specific numeric reference should not be interpreted as a literal sequential order but rather interpreted that the first server application is different than a second server application. Thus, the specific details set forth are merely exemplary. The specific details may be varied from and still be contemplated to be within the spirit and scope of the present invention. A messaging server will be used as an example server system using the server starter program and the monitor program; however, other servers may use these programs as well.

In general, various methods and apparatuses are described for a server that includes at least a server starter program, a monitor program, and a probing program. The server starter program contains code scripted to start and stop server software applications. The monitor program may run resident as a daemon. The monitor program contains code scripted to detect a failure associated with each server software application and to communicate to the server starter program to re-start one or more server applications based upon the detected failure associated with that server application. The probing program contains code scripted to detect a failure on a database based on remaining usable disk space and then to connect to the monitor program to communicate to the monitor program to initiate the restart instruction to the server starter program. The probing program may contain code scripted to connect via a particular protocol used by a server application to that server application and then communicates via the protocol used by that server application to determine if that server application is functioning correctly. The server starter program, the monitor program and the probing program cooperate to allow the automatic detection of a failure with a server component by the software running in the single server and that software attempts to correct the detected failure by re-starting a failed server application in the appropriate sequence.

FIG. 1 illustrates an embodiment of messaging server that includes a server starter program and a monitor program. The example messaging server 100 may contain the following server software applications a Message Transfer Agent (MTA) 102, a Message Store 104, a Lightweight Directory Access Protocol (LDAP) 106, a Domain Name Server (DNS) 108, and other similar server applications as well as a server starter program 110, a monitor program 112, a probing program 114. The above software may be stored on and run resident a computer readable storage medium such a hard disk drive.

The MTA 102 receives, routes, transports, and delivers mail messages using a protocol such as Simple Mail Transfer Protocol (SMTP). SMTP is a standard e-mail protocol on the Internet that defines the message format and the message transfer agent (MTA), which stores and forwards the mail. The MTA 102 contains code scripted to perform as an electronic mail deliverer dispersing messages to an electronic mailbox or to another MTA. The MTA 102 acts as the routing part of a messaging system. The MTA queue cache may be configured with near zero recovery time based upon the automatic failure detection storing and rebuild on restart via the server starter program 110, the monitor program 112, and the probing program 114.

The server starter program 110 runs resident when prompted by system software scripts such as a start up or a refresh instruction, or receipt of a re-start instruction, such as a call, from the monitor program 112. The server starter program 110 contains code scripted to start and stop server software applications.

The monitor program 112 may be scripted to always run resident as a daemon. The monitor program 112 contains code scripted to detect a failure associated with any of the server software applications and to communicate the server starter program 110 to re-start one or more server software applications based upon the detected failure associated with a server software application.

Note, a daemon is a Unix program that executes in the background ready to perform an operation when required. A daemon is usually an unattended process that is initiated at startup and functions like an extension to the operating system.

The probing program 114 contains code scripted to detect a corrupted file on a database, a near full database, or a faulty server application, and then connect to the monitor program 112 to communicate to the monitor program 112 to initiate a restart communication to the server starter program 110.

The monitor program 112 and the probe program transparently monitor the server software applications and other server components and initiate an automatic restarting of the applications if these monitored server applications crash or become unresponsive (i.e. the services hangs). The monitor program 112 generally monitors server application crashes and failures. The probing program 114 generally monitors server hangs by checking the response time. When a server application fails or stops responding to requests outside of a user programmable time threshold, the server application is automatically restarted via the server starter program 110.

The Message Store 104 may consist itself of a set of server applications that store, retrieve, and manipulate messages for mail clients. Example server applications Post Office Protocol (POP) 104c, Internet Message Access Protocol (IMAP) 104b, or HyperText Transport Protocol (HTTP) 104a clients can retrieve mail from the database. POP servers 104c download messages to the client machine for reading and storage. IMAP clients and HTTP clients read and store messages on the server 100 via the IMAP server 104b and the HTTP server 104a. The Message Store 104 is like an electronic mailbox that stores and retrieves mail for users. The IMAP server application 104b is a standard interface between an e-mail client program and the mail server 100. The IMAP and POP are two common access protocols between an e-mail client program and the mail server used for Internet e-mail. Essentially, these server applications 104a-104c provide a message store that holds incoming e-mail until users log on and download the e-mails.

The LDAP directory 106 stores, retrieves, and distributes mail directory information for the Messaging Server 100. This includes user routing information, distribution lists, configuration data, and other information necessary to support delivery and access of email. The LDAP directory 106 is a directory of mail addresses, aliases, routing information, passwords, and any other information needed by the MTA 102 or Message Store 104 to deliver and retrieve messages.

LDAP is a protocol used to access a directory listing. LDAP support is implemented in Web browsers and e-mail programs, which can query an LDAP-compliant directory. The LDAP provides a common method for searching e-mail addresses on the Internet, acting as a global white pages.

The DNS 108 translates domain names into IP addresses. The DNS 108 generally needs to be started by the server starter program 110 or at least detected as being resident before the Messaging Server 100 is installed.

Figure 2:
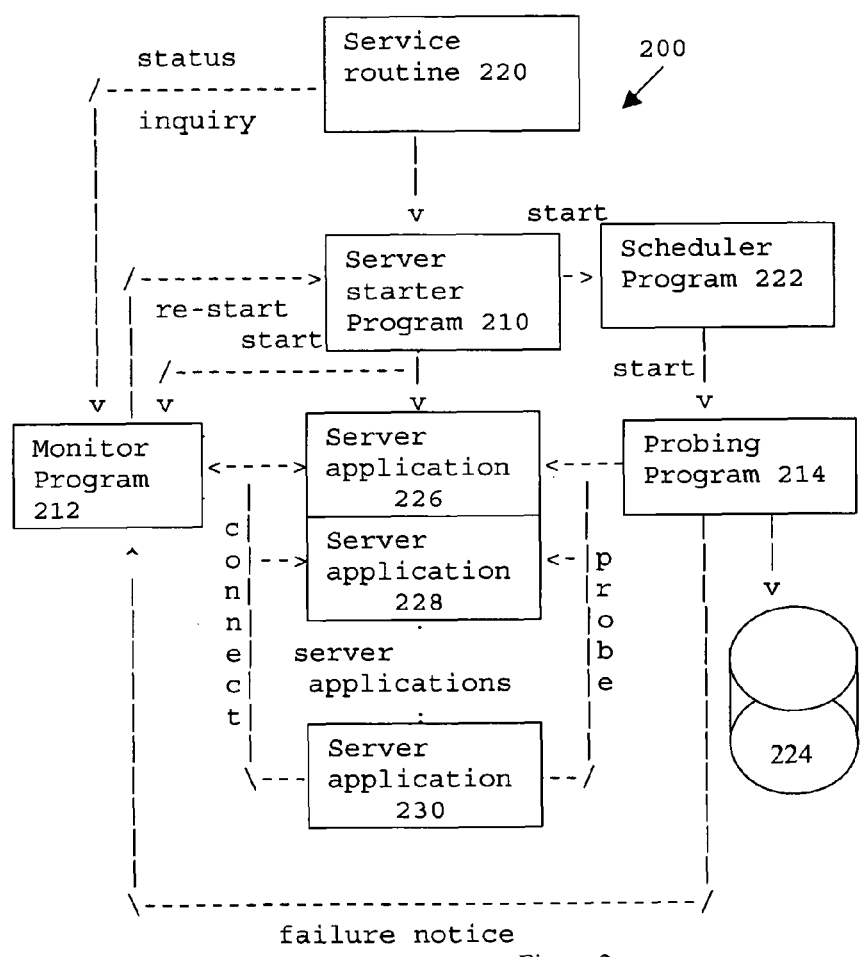
FIG. 2 illustrates an embodiment of a server that includes a server starter program to start and stop all server applications in a server and a monitor program to communicate to the server starter program to re-start one or more server applications based upon a detected failure associated with a first server application.

FIG. 2 illustrates an embodiment of a server that includes a server starter program to start and stop all server applications in a server and a monitor program to communicate to the server starter program to re-start one or more server applications based upon a detected failure associated with a first server application. The server 200 may contain a service program 220, a server starter program 210, a scheduler program 222, a monitor program 212, a probing program 214, and various other server applications 226-230 such as an IMAP and POP e-mail applications.

The service program 220 registers as an operating system service with the operating system of the server 200. The service program 220 controls requests and to communicate to the operating system on behalf of all of the server applications 202-230 in the server. The service program 220 may register as a Windows Service™ with a Windows™ based operating system. In this case, the service program 220 controls requests and communicates to a service control manager of the Windows operating System™ on behalf of all of the server applications 202-230 in the server 200.

On startup, the service program 220 invokes the server starter program 210, which starts the monitor program 212 and the other server applications. On shutdown, the service program 220 invokes the server starter program 210 to stop the server applications 202-230 and the monitor program 212.

The service program 220 also connects to the monitor program 212 to get server status information and updates the service control manager periodically.

The server starter program 210 runs resident on a computer readable storage medium when prompted by operating system scripts, such as calls of start-msg, refresh, or stop-msg scripts, or receipt of a re-start instruction from the monitor program 212. The server starter program 210 contains code scripted to automatically start and stop all of the server software applications 202-230. The server starter program 210 contains code scripted to start the monitor program 212 before starting all other server applications. The server starter program 210 contains code scripted to know the dependency of the server applications in the server and which server applications need to be started before other server applications may be started. The scripting knowledge scripted into the server starter program 210 may be created by the server developer rather than by a user. Thus, the complex restart logic for start order and dependencies of server applications as well as specific product knowledge may be scripted into the code of the server starter program 210 by the server developer.

The server starter program 210 may contain code scripted to re-start merely a single server application, such as a first server application 226, based upon the detected failure associated with the first server application 226. Alternatively, the server starter program 210 may contain code scripted to re-start all of the server applications 202-230 that were enabled at start-up based upon the detected failure associated with a server application. Thus, if any of the message store server applications fail or freeze, all message store server applications that were enabled at start-up are restarted via the server starter program 210. For example, if an instance of IMAP application fails, then all instances of the IMAP application are restarted. If other message store server applications were running, such as the POP or HTTP servers, then those will be restarted as well, whether or not they failed. The server starter program 210 may contain code scripted to re-start the failed server application as well as all server applications on that depend on that failed server application.

As discussed, the monitor program 212 may always run resident as a daemon on the computer readable storage medium. The monitor program 212 contains code scripted to detect a failure associated with any of the server software applications and to communicate to the server starter program 210 to re-start one or more server software applications based upon the detected failure associated with that server software application. The monitor program 212 monitors and also records server application failures and unresponsive services. The monitor program 212 logs error messages to a default log file indicating specific failures associated with specific applications and services. The monitor program 212 also records all of the server applications that have registered with the monitor program 212. In an embodiment, the monitor program 212 calls the operating system to detect the status of socket for each server application that has registered with the monitor program 212.

The server starter program 210 starts and stops server applications in a logical order based on dependency. Upon startup, server processes connect to the monitor program 212 over a communication link such as a socket, so that the monitor program 212 can detect failure. The monitor program 212 then maintains an array of data structures that keep track of the state of the connected server applications.

Note, a Unix socket may consist of the combination of the IP address of the station and a port number. The port number resides in the TCP header as well as in the UDP header associated with a particular application.

When a server application crashes (i.e. fails), the monitor program 212 immediately detects the broken socket connection and initiates a restart by invoking the server starter program 210 to restart the failed server. The server starter program 210 may shutdown and restart related server processes to recover corrupted data, if needed.

The monitor program 212 may also contain additional code scripted to ensure only one instance of the server starter program 210 is running resident and not to invoke a second server starter program to concurrently run resident. The monitor program 212 may also contain additional code scripted to determine if a server fails repeatedly, determined by number of failures within a specific period of time, then the monitor program 212 will not call to restart the server, as administrative intervention is required.

The probing program 214 runs resident when prompted by the scheduler program 222 on the computer readable storage medium. A user may program a setting, for example every ten minutes, in the scheduler program 222 to control the periodic running of probing program 214. The probing program 214 contains code scripted to connect via the particular protocol used by a server application to that server application. The probing program 214 contains code scripted to initiate two-way communications via the protocol used by that server application to determine if that server application is functioning correctly. For example, if the first server application 226 uses POP, then the probing program 214 communicates to the first server application 226 in the POP protocol. The probing program 214 may use the error detection methods built into each different protocol to detect a failure as well as detect non-responsive server application via a threshold non-response time period programmed by a user. A server application that is non-response for equal to or greater than this time period will trigger the probing program 214 to generate a failure notice to the monitor program 212.

In an embodiment, the probing program 214 connects to the enabled server applications using their protocol commands and measures the enabled server applications' response times. If the response time exceeds the alarm warning threshold, an alarm message is sent. If an autorestart option is enabled, and the probing program 214 cannot connect to a server application, or the server application response time exceeds a specified timeout period, the server application is restarted. Server response times may be recorded in a counter database 224 and are logged to the default log file.

The probing program 214 also contains code scripted to detect a corrupt file associated with a database 224. When the probing program 214 detects a corrupted file on the database 224, then the probing program 214 connects to the monitor program 212 to communicate to the monitor program 212 to initiate a restart communication to the server starter program 210. Likewise, when the probing program 214 detects a malfunctioning server application, then the probing program 214 connects to the monitor program 212 to communicate to the monitor program 212 to initiate a restart communication to the server starter program 210.

The probing program 214 also contains code scripted to detect the amount of usable disk space on the database 224 and to detect a failure of the database 224 based on remaining usable disk space. A full or near full hard disk triggers the probing program 214 to generate a failure notice to the monitor program 212.

In an embodiment, the probing program 214 checks the disk availability and usage for every message store partition. Specifically the probing program 214 checks a database directory, such as the message store mboxlist database directory or the MTA queue directory. If disk usage exceeds a configured threshold, an alarm message is sent. The disk sizes and usages are recorded in a counter database and are logged to the default log file. Administrators can then use a system utility, such as the counter utility, to display the disk usage statistics. Further, the Message Store may maintain a mboxlist Database Log File Accumulation. The Log file accumulation is an indication of an mboxlist database error. The probing program 214 counts the number of active log files and if the number of active log files is larger than the threshold, then either 1) the probing program 214 logs a critical error message to the default log file to inform the admin to restart the server or 2) causes the server starter program 210, via the monitor program 212, to restart the message store daemon.

The scheduler program 222 executes the probing program 214 periodically. The scheduler program 222 is started by the server starter program 210, if needed.

Each of the various server applications connects to the monitor program 212 over a loopback Transmission Control Protocol (TCP) such as an internal socket. The monitor program 212 maintains a log of connected server applications. The monitor program 212 calls the server start program to restart one or more server applications on either a detection of a failure with the internal socket for the that server application, such as a connection drop, or a notification of another failure associated with that server application from the probing program 214.

The server starter program 210, the monitor program 212, and the probing program 214 may cooperate together to cumulatively contain code scripted to detect failures with one or more server applications in a single server node and then re-start new instances of a failed server application based upon the detected failure of the failed server application independent of and without an administrator's intervention. The server starter program 210, the monitor program 212, and the probing program 214 may be scripted as three separate programs. Alternatively, they could be scripted, for example, as a single program scripted to contain functionality of all three programs.

The monitor program 212 may contain code scripted to have instruction calls to use a shared library for cross-platform standard Operating System system-calls but no other calls to use the shared library to implement application specific functions. Also, the monitor program 212 may be a simple single-threaded process. Thus, the code of the monitor program 212 may be scripted to be generic and re-useable across any server implementation. Yet, the server starter program 210 and probing program 214 should have code scripted for the specific server applications running on that server implementation 200.

In an embodiment, the monitor program 212 may be coded to use standard Operating System system-calls in a shared library such as converting between a long integer and base ASCII strings, terminating a process abnormally, string conversion routines, memory operations, message handling functions, and other similar standard OS call functions.

Figure 3:
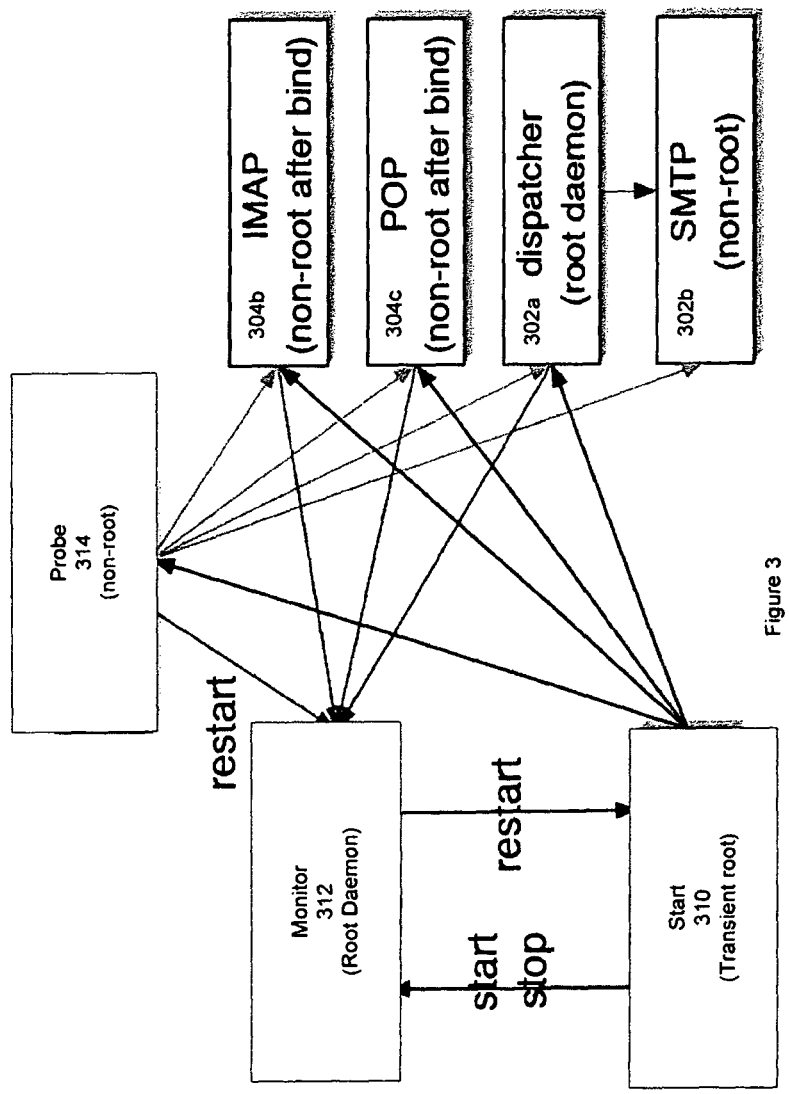
FIG. 3 illustrates another embodiment of a server that includes a server starter program and a monitor program.

FIG. 3 illustrates an embodiment of a server that includes a server starter program and a monitor program. The server 300 may contain a server starter program 310, a monitor program 312, a probing program 314, an IMAP server application and POP server application in the message store, a dispatcher server application and a SMTP server application in the MTA, etc.

The server starter program 310 contains code scripted to have transient root level access privileges. Root level access privileges in a Solaris™ environment are similar to super user privileges in a Unix™ environment and Administrator access privileges in a Windows™ environment. The most secure and fundamental files may be accessed by an application having root level access privileges. When the server starter program 310 is invoke by the monitor program 312 or the service program, then the server starter program 310 may start up any server applications that it is scripted to start up. Similarly, the server starter program 310 may shutdown any server applications that it is scripted to shutdown. In an embodiment, the server starter program 310 may have root level access privileges to restart, for example, an Internet Server that needs root privilege to bind to privileged ports.

The monitor program 312 may contain code scripted to give the monitor program 312 permanent root level access to server applications and files on the server.

The probing program 314 does not need to run with administrator (i.e. super user) privilege; thereby, reducing the security risks associated with high privilege access. As discussed before, the server starter program 310, the monitor program 312 and the probing program 314 cooperate together to cumulatively contain code scripted to detect failures with the one or more server applications in a single server node and then re-start new instances of a failed server application based upon the detected failure of the failed server application.

The server starter program 310, the monitor program 312 and the probing program 314 improve server robustness substantially within a single machine. The server starter program 310, the monitor program 312, and the probing program 314 allow the automatic detection of a failure with a server component by the software running in the single server and that software attempts to correct the detected failure by re-starting a failed server application in the appropriate sequence. The server starter program 310, the monitor program 312 and the probing program 314 can also be used to facilitate an integration with a HA framework using two or more servers functioning as a cluster. In a HA framework, the HA agent monitors the calls from the monitor program 312. When a server failed repeatedly in a HA environment, the monitor program 312 shuts down everything and exits with an error code to initiate a HA failover to the alternate server. In either a HA framework or a standalone server, the mean time to recover from a server application failure should be improved because the detection of the failure is either immediate with detected failure such as a socket failure.

In an embodiment, the monitor program 312 may be scripted with less than 1000 lines of C with no shared library dependences beyond basic cross-platform OS services. The monitor program 312 contains code scripted to have instruction calls to a shared library for cross-platform Operating System services and no other instruction calls to the shared library.

In an embodiment, the monitor program 312 has a Service Status field display for status information about the server applications. For example, for the POP, IMAP, and HTTP server applications, the Service Status field display shows the last connection time, the total number of connections, the current number of connections, the number of failed connections since the service last started, and the number of failed logins since the service last started. The information in the Service Status field display helps a user to understand the load on the server and the reliability of its service, and it can help spotlight attacks against the server's security.

Referring to FIG. 1, a message path through the Messaging Server System 100 may be as follows. Incoming messages from the Internet or local clients are received by the MTA 102 through the Simple Mail Transport Protocol (SMTP). If the address is internal, that is, within the Messaging Server domain, the MTA 102 delivers the message to the Message Store 104. If the message is external, that is, addressed to a domain outside of Messaging Server's control, the MTA 102 relays the message to another MTA on the Internet.

Local messages are usually delivered to the Message Store 104. Messages are then retrieved by an IMAP server application 104b, a POP server application 104c, or a HTTP client server application 104a.

The LDAP directory server 106 stores and retrieves local user and group delivery information such as addresses, alternate mail addresses, and mailhost. When the MTA 102 receives a message, it uses this address information to determine where and how to deliver the message.

In addition to storing messages, the Message Store 104 uses the directory server to verify user login name and passwords for mail clients accessing their mail. The LDAP directory server 106 also stores information about quota limits, default message store type, and so on.

Outgoing messages from mail clients go directly to the MTA 102, which sends the message to the appropriate server on the Internet. If the address is local, the MTA 102 sends the message to the Message Store 104.

Adding user and group entries to the LDAP directory server 106 creates new users and groups. Entries can be created or modified by using the User Management Utility, or by modifying the directory using LDAP.

Thus, SMTP server applications route SMTP messages throughout the Internet to a mail server 100 that provides a message store 104 for incoming mail. The mail server 100 uses the HTTP, POP, or IMAP access protocol to communicate with the user's e-mail program.

In one embodiment, the software used to facilitate the functions described above may be embodied onto a computer readable storage medium. The computer readable storage medium includes any mechanism that provides (e.g., stores and/or transmits) information in a form readable by a machine (e.g., a computer). For example, a computer readable storage medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

While some specific embodiments of the invention have been shown the invention is not to be limited to these embodiments. For example, most functions performed by software may be duplicated by electronic hardware components that include logic components. Thus, a software program written to accomplish specific functions may be emulated by solely hardware components in electronic circuitry or a combination of software and hardware. In some instances, some of the software scripts are identified as being written in the C programming language. However, the software scripts may be capable of being implemented in many programming languages. The invention is to be understood as not limited by the specific embodiments described herein, but only by scope of the appended claims.

What is claimed is:

1. A non-transitory computer readable storage medium having a computer readable program embodied therein, said computer readable program for execution on a server, the non-transitory computer readable storage medium comprising:
   service program code to run resident on the server and register as a service of an operating system for the server, the service program code including instructions to control requests, to communicate with the operating system on behalf of a plurality of server applications, and to invoke a server starter program code to start particular server applications of said plurality of server applications;
   the server starter program code to run resident on the server with root-level access privileges, the server starter program code including instructions scripted to start and stop the particular server applications of the plurality of server applications in a logical order according to dependencies of the particular server applications and to initiate a monitor program code before starting any of said particular server applications;
   a probing program code to run resident on the server without the root-level access privileges, the probing program code containing instructions scripted to detect a failure associated with a first server application of the plurality of server applications and communicate the failure to the monitor program code; and
   the monitor program code to run resident on the server with the root-level access privileges, the monitor program code including instructions scripted to communicate with the server starter program code to re-start one or more of the particular server applications based upon the detected failure associated with the first server application.

2. The non-transitory computer readable storage medium of claim 1, wherein the probing program code contains instructions scripted to connect, via a respective protocol used by a respective one of the server applications, to each server application, and then communicate via the respective protocol used by that server application to determine if that server application is functioning correctly.

3. The non-transitory computer readable storage medium of claim 2, wherein the server starter program code, the monitor program code, and the probing program code are scripted as three separate program codes.

4. The non-transitory computer readable storage medium of claim 1, wherein the probing program code detects the failure associated with the first server application at least in part by detecting a corrupted file associated with a database.

5. The non-transitory computer readable storage medium of claim 1, wherein a first one of the server applications connects to the monitor program code over an internal socket, and the monitor program code calls the server starter program code to restart one or more of the server applications on either a detection of a failure with the internal socket for the first server application or a notification of another failure associated with the first server application.

6. The non-transitory computer readable storage medium of claim 1, wherein the monitor program code contains instructions scripted to have instruction calls to use a shared library for Operating System system-calls but no other calls to use the shared library.

7. The non-transitory computer readable storage medium of claim 1, wherein the service program code contains instructions scripted to register as a Windows service with the operating system to control requests and to communicate to a service control manager of the operating system on behalf of all of the server applications.

8. The non-transitory computer readable storage medium of claim 1, wherein the server starter program code and the monitor program code cooperate together to cumulatively contain instructions scripted to detect failures with one or more server applications in a single node and then re-start Previously Presented instances of a failed server application based upon a detected failure of the failed server application.

9. The non-transitory computer readable storage medium of claim 1, wherein the server starter program code contains instructions scripted to re-start merely one of the server applications based upon a detected failure associated with the one server application.

10. A system, comprising:
   a messaging server that includes a non-transitory computer readable storage medium having a computer readable program embodied therein for execution on the messaging server, the non-transitory computer readable storage medium having:
   a message store program code to store, retrieve and manipulate messages;
   a service program code to run resident on the messaging server and register as an operating system service for the messaging server, the service program code including instructions to control requests, to communicate with the operating system on behalf of one or more server applications, and to invoke a server starter program code to start others of said server applications;
   the server starter program code to run resident on the messaging server, the server starter program code including instructions scripted to start and stop the server applications in a logical order according to dependencies of the server applications and to initiate a monitor program code before starting any others of said server applications;
   the monitor program code to run resident on the messaging server, the monitor program code including instructions scripted to detect a failure associated with a first of the server applications and to communicate with the server starter program code to re-start one or more of the server applications based upon the detected failure associated with the first server application; and a probing program code to run resident on the messaging server, wherein the probing program code contains instructions scripted to detect a failure on a database associated with the message store program code based on remaining usable disk space and then connect to the monitor program code to communicate to the monitor program code to initiate a restart communication to the server starter program code, wherein the probing program code contains instructions scripted to connect via a protocol used by the first server application to the first server application and communicates via the protocol used by the first server application to determine if the first server application is functioning correctly, and wherein the probing program determines if the first server application is functioning correctly by measuring a response time of the first server application.

11. The system of claim 10, wherein the monitor program code contains instructions scripted to give the monitor program code permanent root level access to files on the messaging server.

12. The system of claim 10, wherein the probing program code contains instructions to run resident when prompted by a scheduler program code on the messaging server.

13. A method, comprising:
registering a service program as an operating system service with an operating system of a server;
invoking a single instance of a server starter program code to start other server applications in the server;
inhibiting invocation of additional instances of the server starter program code while the single instance of the server starter program code runs;
initiating a monitor program before starting any of the server applications and then starting others of the server applications in a logical order according to dependencies of the server applications;
upon detecting a failure of a first one of the server applications, communicating to the server starter program code to re-start merely the first server application; and
communicating to the operating system on behalf of all of the server applications in the server.

14. The method of claim 13, further comprising:
connecting to the first server application via a specific protocol used by the first server application; and
initiating two-way communications with the first server application via the specific protocol used by the first server application to determine if the first server application is functioning correctly.

15. A non-transitory computer readable storage medium having a computer readable program embodied therein, said computer readable program for execution on a server computer, the non-transitory computer readable storage medium comprising:
a service program code to run resident on a server computer and register as an operating system service with an operating system of the server computer, the service program code including instructions to control requests, to communicate with the operating system on behalf of one or more server applications;
an application program code for invoking a server starter program code to start other server applications in the server computer;
the server starter program code to run resident on the server computer, the server starter program code including instructions scripted to start and stop the server applications in a logical order according to dependencies of the server applications and to initiate a monitoring program code before starting any others of said server applications;
the monitoring program code to run resident on the server computer for communicating to the server starter program code to re-start merely a first one of the server applications based upon a detected failure associated with the first server application; and
a communication program code for communicating to the operating system on behalf of all of the server applications in the server computer,
wherein the server starter program code and the monitor program code cooperate together to cumulatively contain instructions scripted to detect failures with a plurality of server applications in a single node and then restart Previously Presented instances of a failed plurality of server applications based upon detected failures of the plurality of failed server applications, wherein the monitoring program code includes instructions to determine a total number of failures of each of the server applications within a specified time period.

16. The non-transitory computer readable storage medium of claim 15, further comprising:
a first probing program code to run resident on the server computer for connecting to the first server application via a specific protocol used by the first server application; and
a second probing program code for initiating two-way communications with the first server application via the specific protocol used by the first server application to determine if the first server application is functioning correctly.

17. The non-transitory computer readable storage medium of claim 15, wherein the monitoring program code includes instructions to:
determine, for each server application whether the total number of failures is greater than a threshold number of failures; and
inhibit communications to the server starter program code to restart a particular one of the server applications when it is determined that its total number of failures is greater than the threshold number of failures.

18. The system of claim 10, wherein in response to the probing program code ascertaining that the measured response time of the first server application exceeds a warning threshold or a specified timeout period:
an alarm is sent; or
the first server application is restarted.

19. The non-transitory computer readable storage medium of claim 1, wherein the probing program code detects the failure associated with the first server application at least in part by detecting a particular amount of remaining usable disk space.

20. The non-transitory computer readable storage medium of claim 1, wherein the probing program code detects the failure associated with the first server application at least in part by detecting a particular amount of remaining usable disk space.

* * * * *